(12) United States Patent
Lin

(10) Patent No.: US 9,792,481 B2
(45) Date of Patent: Oct. 17, 2017

(54) FINGERPRINT SENSOR AND METHOD THEREOF

(71) Applicant: EGIS TECHNOLOGY INC., Taipei (TW)

(72) Inventor: Todd Lin, Taipei (TW)

(73) Assignee: EGIS TECHNOLOGY INC., Taipei (TW)

( * ) Notice: Subject to any disclaimer, the term of this patent is extended or adjusted under 35 U.S.C. 154(b) by 38 days.

(21) Appl. No.: 14/979,432

(22) Filed: Dec. 27, 2015

(65) Prior Publication Data

US 2017/0109559 A1 Apr. 20, 2017

(30) Foreign Application Priority Data

Oct. 16, 2015 (CN) .......................... 2015 1 0674135

(51) Int. Cl.
G06K 9/00 (2006.01)
G06F 3/0354 (2013.01)
G06F 3/044 (2006.01)
G06F 3/041 (2006.01)

(52) U.S. Cl.
CPC ....... G06K 9/00013 (2013.01); G06K 9/0002 (2013.01); G06K 9/00087 (2013.01); G06F 3/03547 (2013.01); G06F 3/044 (2013.01); G06F 3/0416 (2013.01); G06K 9/00006 (2013.01)

(58) Field of Classification Search
CPC ........ G06F 3/044; G06F 3/041; G06F 3/0416; G06F 3/03547; G01R 27/2605; H04N 5/378; G06K 9/00006; G06K 9/00013; G06K 9/00087; G06K 9/002
See application file for complete search history.

(56) References Cited

U.S. PATENT DOCUMENTS

| | | | |
|---|---|---|---|
| 9,285,902 B1* | 3/2016 | Kremin | G06F 3/044 |
| 2013/0021294 A1* | 1/2013 | Maharyta | G06F 3/044 |
| | | | 345/174 |
| 2014/0333328 A1* | 11/2014 | Nelson | G06F 3/044 |
| | | | 324/663 |
| 2016/0140376 A1* | 5/2016 | Kremin | G01R 27/2605 |
| | | | 382/124 |

FOREIGN PATENT DOCUMENTS

| | | |
|---|---|---|
| CN | 1278347 A | 12/2000 |
| CN | 104573649 A | 4/2015 |
| TW | 201416991 A | 5/2014 |
| WO | WO 98/52145 | 11/1998 |

* cited by examiner

Primary Examiner — Kenny Cese
(74) Attorney, Agent, or Firm — Li&Cai Intellectual Property (USA) Office

(57) ABSTRACT

Disclosed are a fingerprint sensor and a fingerprint sensing method thereof. The fingerprint sensor comprises a substrate, a plurality of sensing electrodes, an integrated circuit and a protection layer. The substrate has a first surface and a second surface. The sensing electrodes are configured on the first surface of the substrate, and electrically connected to the integrated circuit. The integrated circuit comprises a plurality of phase shifters, and each phase shifter is electrically connected to its corresponding sensing electrode to control the phase of electric signal transmitted by the sensing electrode. The first surface of the substrate is covered by the protection layer.

12 Claims, 5 Drawing Sheets

FINGERPRINT SENSOR AND METHOD THEREOF

BACKGROUND OF THE INVENTION

1. Field of the Invention

The present invention relates to a fingerprint sensor and a fingerprint sensing method; in particular, to a fingerprint sensor and a fingerprint sensing method that can improve the defocusing of electric field distribution.

2. Description of Related Art

In recent years, mobile devices have been widely used by people. Particularly, those personal mobile devices having touch panels have become an essential tool in our daily life and at work. To comply with safety requirements, those personal mobile devices are usually installed with a code locking process, and the codes could be numbers, patterns or biometric features, such as fingerprints.

In terms of personal mobile devices using the fingerprint sensing technology, the sensibility of the fingerprint sensors is limited and restricted by the thickness of each structure layer which covers upon the sensing electrodes, such as the protection layer of the touch panel of the mobile device, because of the defocusing of the distribution of electric field.

Please refer to FIG. 1. FIG. 1 shows a schematic diagram of a conventional fingerprint sensor according to the prior art. In the prior art, applying electric fields at both sides of the sensing electrode to improve the defocusing of the distribution of electric field is common. As shown in FIG. 1, the electric field E is applied at the left side and the right side of the sensing electrode S such that the distribution of the electric field would tend to converge to the central part which makes the electric signals transmit for a longer distance. However, as known by those skilled in the art, the sum of the thickness of layers that the electric signals can transmit through is still limited.

SUMMARY OF THE INVENTION

The present invention provides a fingerprint sensor, and the fingerprint sensor comprises a substrate, a plurality of sensing electrodes, an integrated circuit and a protection layer. The substrate has a first surface and a second surface. The sensing electrodes are disposed on the first surface of the substrate and configured to transmit and receive electric signals. The integrated circuit is disposed on the first surface of the substrate, and the sensing electrodes are electrically connected to the integrated circuit. The protection layer covers upon the first surface of the substrate. The integrated circuit comprises a plurality of phase shifters, and each phase shifter is electrically connected to each sensing electrode correspondingly so as to control the phase of the electric signals transmitted by each sensing electrode.

The present invention further provides a fingerprint sensing method used in a fingerprint sensor, and the fingerprint sensing method comprises: turning on a first part of sensing electrodes on a substrate; controlling the turned-on sensing electrodes via a plurality of phase shifters in an integrated circuit, wherein the phase shifters are corresponding to the first part of the sensing electrodes; transmitting electrical signals through a protection layer covering upon the substrate to the finger surface of a user via the controlled and turned-on sensing electrodes; and receiving electric signals reflected from the finger surface of the user via a second part of the sensing electrodes on a substrate. Each phase shifter is electrically connected to each sensing electrode on the substrate correspondingly so as to control the phase of the electric signals transmitted by the corresponding turned-on sensing electrode.

To sum up, in the fingerprint sensor and the fingerprint sensing method provided by the present invention, the phase shifter controls the phase of the electric signals transmitted by sensing electrodes such that the distribution of the electric fields generated by the sensing electrodes can be convergent, which makes the electric signal able to transmit through a thicker protection layer. In addition, the neighboring sensing electrodes are controlled to be selectively turned on and groups of turned-on sensing electrodes are spaced by at least one turned-off sensing electrode which avoids the direct coupling of electric fields and forces the electric signals to transmit upward for a longer distance and through a thicker protection layer.

For further understanding of the instant disclosure, reference is made to the following detailed description illustrating the embodiments and embodiments of the instant disclosure. The description is only for illustrating the instant disclosure, not for limiting the scope of the claim.

BRIEF DESCRIPTION OF THE DRAWINGS

Embodiments of the present invention are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

It will be understood that, although the terms first, second, third, and the like, may be used herein to describe various elements, but these elements should not be limited by these terms. These terms are only to distinguish one element from another region or section discussed below and could be termed a second element without departing from the teachings of the instant disclosure. As used herein, the term "and/or" includes any and all combinations of one or more of the associated listed items.

Figure 2A:
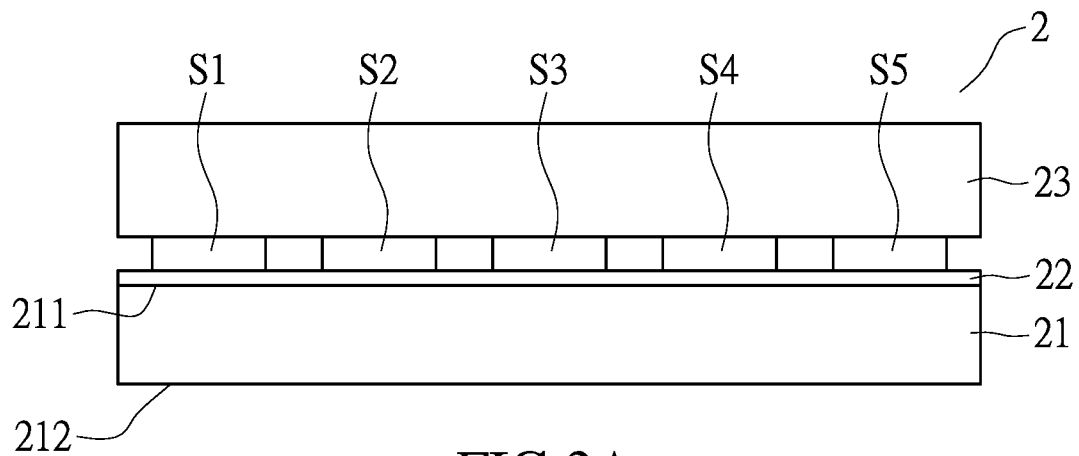
FIG. 2A shows a schematic diagram of a fingerprint sensor of one embodiment of the present invention.
Figure 2B:
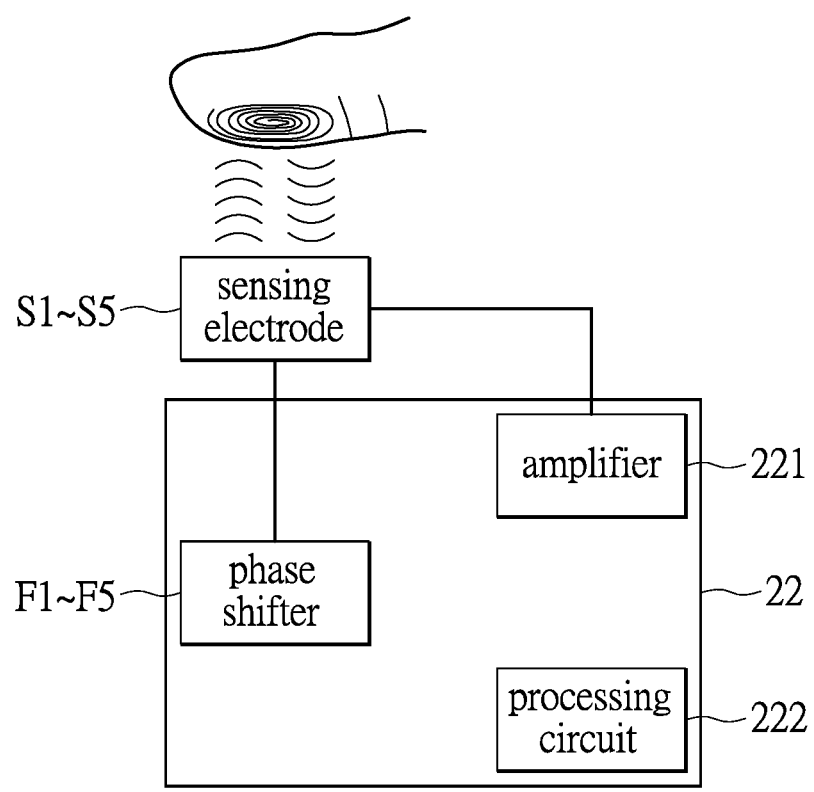
FIG. 2B shows a block diagram of a fingerprint sensor of one embodiment of the present invention.

Please refer to FIG. 2A and FIG. 2B. FIG. 2A shows a schematic diagram of a fingerprint sensor of one embodiment of the present invention, and FIG. 2B shows a block diagram of a fingerprint sensor of one embodiment of the present invention.

As shown in FIG. 2A, the fingerprint sensor 2 comprises a substrate 21, a plurality of sensing electrodes S1~S5, an integrated circuit 22 and a protection layer 23. The substrate 21 has a first surface 211 and a second surface 212. The sensing electrodes S1~S5 are disposed on the first surface 211 of the substrate 21 and configured to transmit and receive electric signals. It should be noted that, the sensing electrodes S1~S5 are disposed on the first surface 211 of the substrate 21 in a one-dimensional linear arrangement or a two-dimensional matrix arrangement. Moreover, the sensing electrodes S1~S5 can be transistors formed on semiconductor materials, glass or film. For instance, the transistors formed on glass or film can be the Thin-Film Transistor (TFT), but it is not limited herein. The integrated circuit 22 is disposed on the first surface 211 of the substrate 21, and the sensing electrodes S1~S5 electrically connected to the integrated circuit 22. The protection layer 23 covers upon the first surface 211 of the substrate 21.

A further illustration is shown in FIG. 2B. In the embodiment of the present invention, the integrated circuit 22 comprises a plurality of amplifiers 221 and a processing circuit 222. Each of the amplifiers 221 is electrically connected to each of the sensing electrodes S1~S5 correspondingly. The processing circuit 222 is electrically connected to the amplifiers 221 so as to process the electric signals received by the sensing electrodes S1~S5. However, the signal processing implemented by the amplifier and the processing circuit of the fingerprint sensor in this embodiment should be well known by those skilled in the art, and thus the information is omitted herein.

Figure 3:
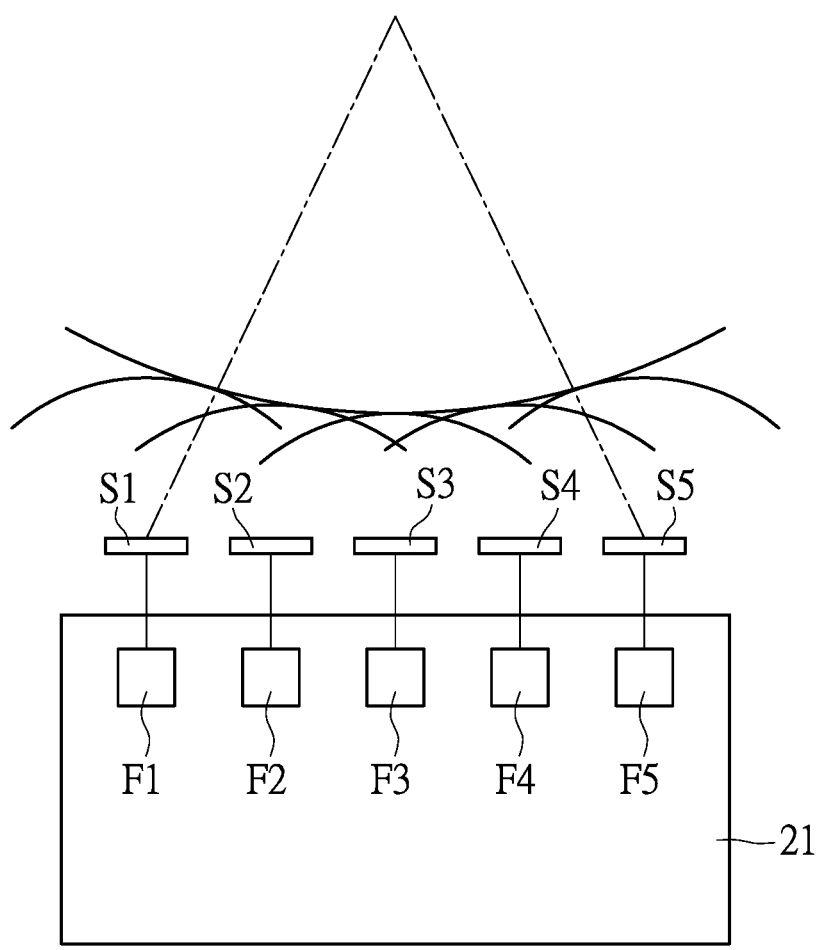
FIG. 3 shows a schematic diagram of an integrated circuit controlling the fingerprint sensor according to one embodiment of the present invention

In order to illustrate how the integrated circuit 22 controls the sensing electrodes S1~S5, please refer to FIG. 3. FIG. 3 shows a schematic diagram of an integrated circuit controlling the fingerprint sensor according to one embodiment of the present invention.

In the embodiment of the present invention, the integrated circuit 22 comprises a plurality of phase shifters F1~F5, and each of them is electrically connected to each of the sensing electrodes S1~S5 so as to control the phase of the electric signal transmitted by each of the sensing electrodes S1~S5. As a result, the distribution of the electric field generated by each of the sensing electrodes S1~S5 can be convergent. In the embodiment of the present invention, each of the sensing electrodes S1~S5 is controlled by a corresponding phase shifter F1~F5 in the integrated circuit 22. Herein, in order to clearly describe, in FIG. 3, the electric fields generated by the sensing electrodes S1~S5 are represented by the wave fronts of the electric signals transmitted by the sensing electrodes S1~S5. To improve the defocusing of electric field distribution of the conventional fingerprint sensor shown in FIG. 1, each of the phase shifters F1~F5 in the integrated circuit 22 adjusts the phase of the electric signal transmitted by the corresponding sensing electrode S1~S5. As shown in FIG. 3, after the phase of the electric signal transmitted by each of the sensing electrodes S1~S5 is adjusted by the corresponding phase shifter F1~F5, the wave fronts of the electric signals transmitted by the sensing electrodes S1~S5 are converged on the same spot.

Figure 1:
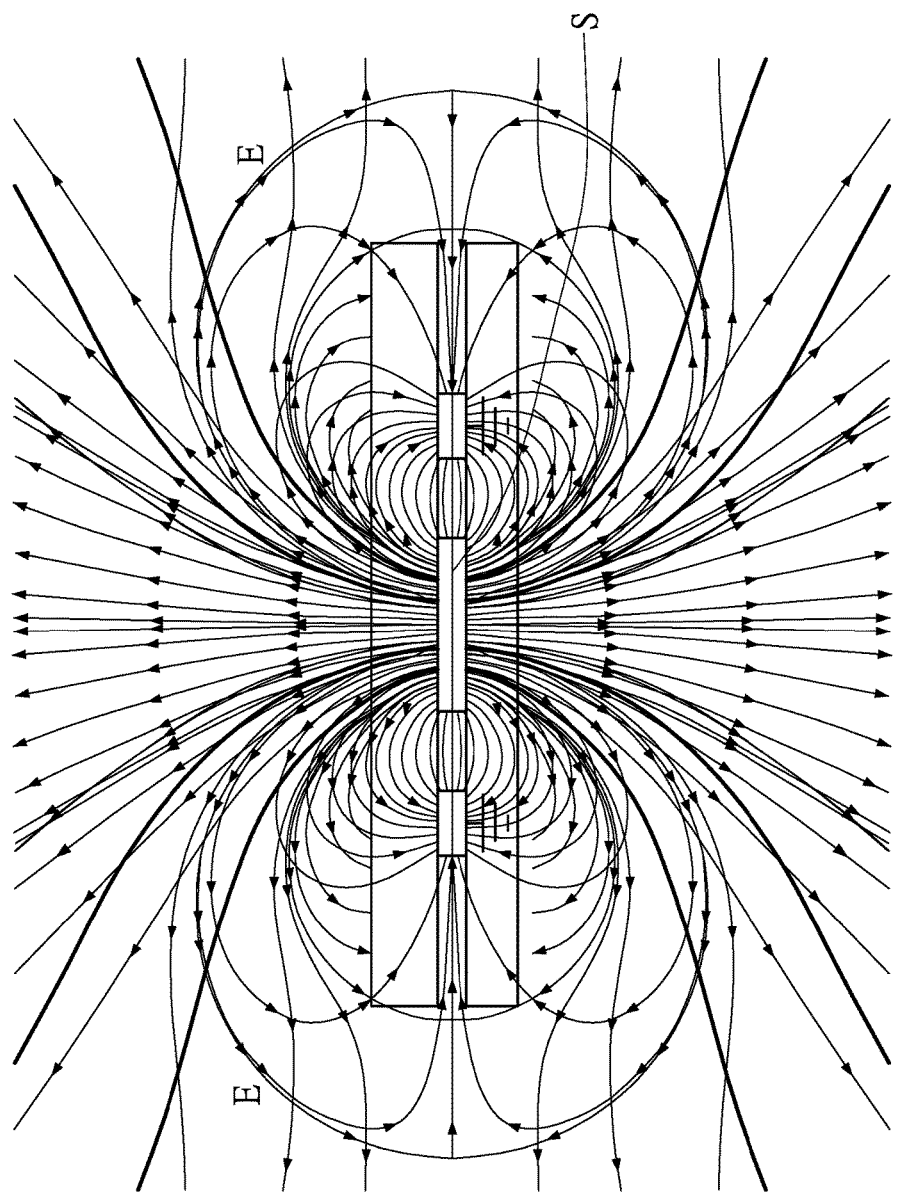
FIG. 1 shows a schematic diagram of a conventional fingerprint sensor according to the prior art.

Comparing the defocusing of electric field distribution between the conventional fingerprint sensor shown in FIG. 1 and the embodiment of the present invention, the phase shifters F1~F5 can adjust the phase of the electric signals transmitted by the sensing electrodes S1~S5, so the wave fronts of the electric signals transmitted by the sensing electrodes S1~S5 can be converged which allows the electric signals to transmit through a thicker protection layer and thus increases the sensing sensitivity of the fingerprint sensor.

Figure 4:
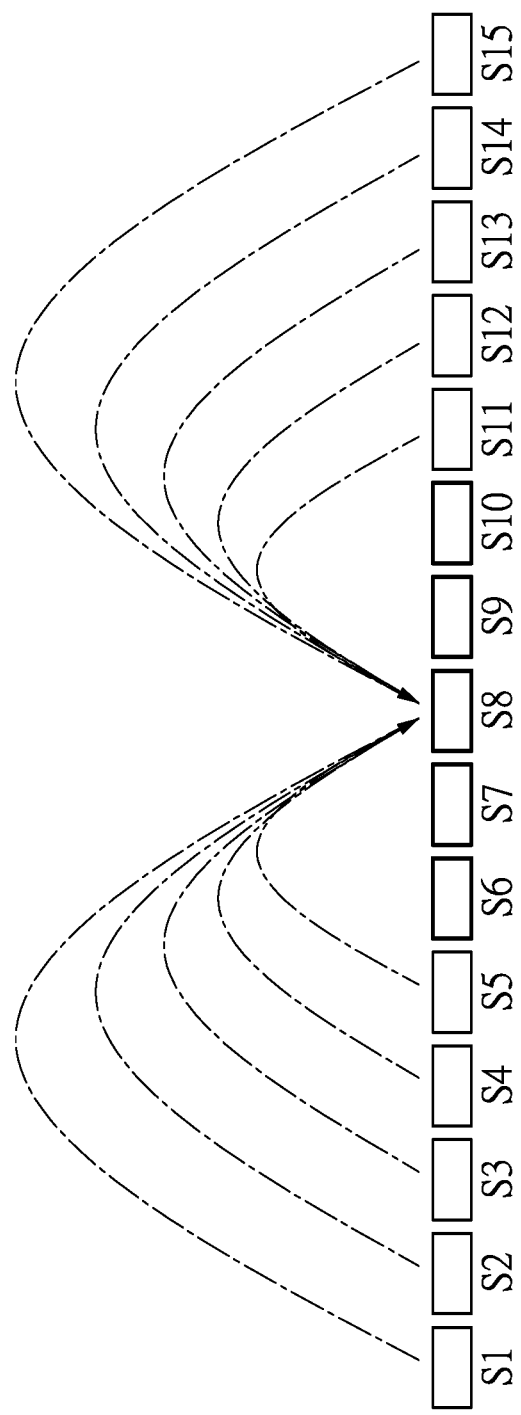
FIG. 4 shows a schematic diagram of an integrated circuit controlling the fingerprint sensors according to another embodiment of the present invention.

In order to further illustrate how the integrated circuit 22 controls the sensing electrodes S1~S5, please refer to FIG. 4. FIG. 4 shows a schematic diagram of an integrated circuit which controls the fingerprint sensor according to another embodiment of the present invention.

In FIG. 4, for a clear description, the sensing electrodes arranged in a line are taken as the example for illustration. As shown in FIG. 4, groups of the sensing electrodes S1~S5 and S11~S15 are controlled to be selectively turned on, and a group of the sensing electrodes S6~S10 are controlled to be selectively turned off. In other words, in the embodiment of the present invention, groups of turned-on sensing electrodes are spaced by at least one turned-off sensing electrode. The turned-on sensing electrodes S1~S5 and S11~S15 can be the signal transmitters, and the turned-off sensing electrodes S6~S10 can be the signal receivers. As shown in FIG. 4, groups of turned-on sensing electrodes S1~S5 and S11~S15 are spaced by a group of turned-off sensing electrodes S6~S10, so there is a distance between the groups of turned-on sensing electrodes S1~S5 and S11~S15, which forces the signals (shown as the distribution of electric field in FIG. 4) generated by the groups of turned-on sensing electrodes S1~S5 and S11~S15 to transmit upward for a longer distance.

Briefly speaking, in the embodiment of the present invention, the sensing electrodes are controlled to be selectively turned on, wherein groups of turned-on sensing electrodes are spaced by at least one turned-off sensing electrode. In this way, the electric signals generated by the turned-on sensing electrodes can transmit upward for a longer distance, and the direct coupling effect of electric fields which may influence the signal transmission can be avoided.

In conclusion, via the phase changes of the electric signals transmitted by the turned-on sensing electrodes made by the phase shifters and turning off at least one sensing electrode between groups of turned-on sensing electrodes, the electric signals can be forced to transmit through a thicker protection layer. For example, the thickness of the protection layer 23 of the fingerprint sensor 2 shown in FIG. 2 can range from 400 µm to 700 µm, and this thickness range comprises the common thickness ranges of the protection layers widely used for the panels of kinds of mobile devices in the current market.

In addition, in the embodiment of the present invention, the fingerprint sensor can be a swipe-type or a touch-type fingerprint sensor, but it is not limited herein. However, the operating principles of these two types of fingerprint sensors should be well understood by those skilled in the art, and thus the information is omitted herein.

Figure 5:
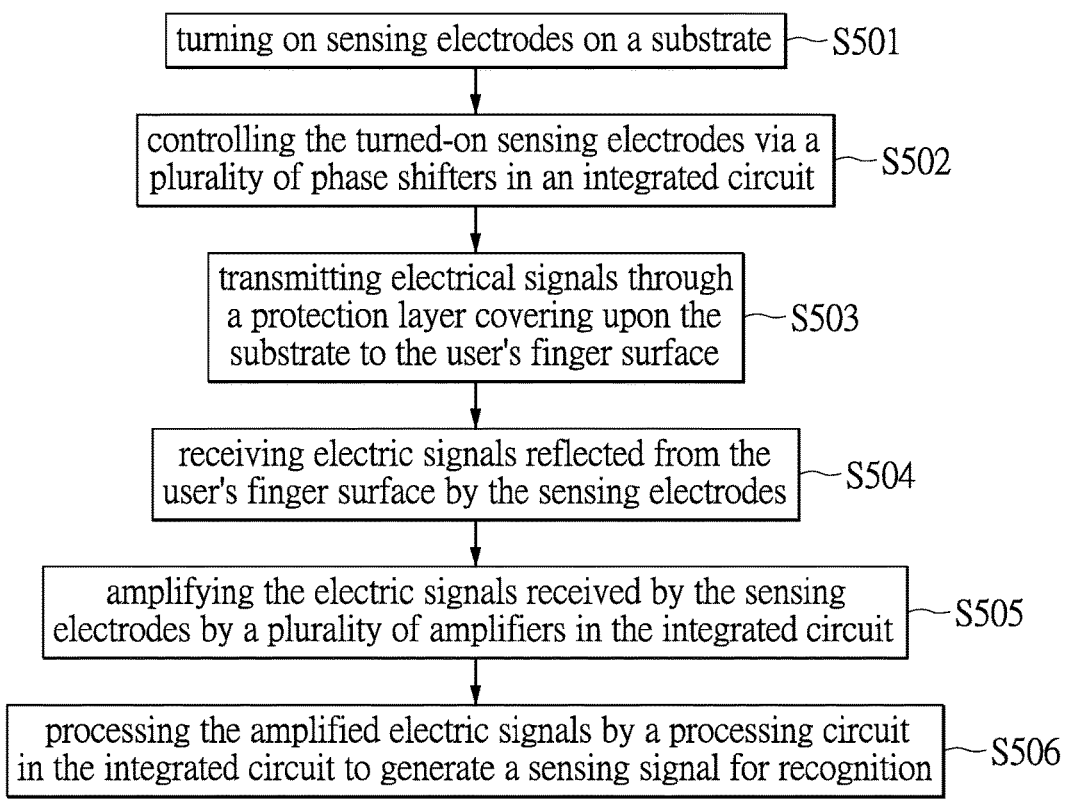
FIG. 5 shows a flow chart of a fingerprint sensing method of one embodiment of the present invention.

Finally, please refer to FIG. 5. FIG. 5 shows a flow chart of a fingerprint sensing method of one embodiment of the present invention. An explanatory sequence of steps of the fingerprint sensing method 500 can be embodied with the fingerprint sensor as shown in FIGS. 2A~2B, 3 and 4, and thus please refer to FIGS. 2A~2B, 3 and 4 for an easier understanding.

As shown in FIG. 5, the fingerprint sensing method 500 in the embodiment of the present invention comprises the following steps. In step S501, a first part of sensing electrodes on a substrate is turned on so as to transmit electric signals. In Step S502, the turned-on sensing electrodes are controlled via a plurality of phase shifters in an integrated circuit, wherein each of the phase shifters is corresponding to each of the sensing electrodes such that the phase of the electric signal transmitted by the corresponding sensing electrode can be controlled and adjusted. Also, in Step S502, the mechanism to control and adjust the phase of the electric signals transmitted by the turned-on sensing electrodes is a dynamic mechanism. In other words, the phase shifters would differently and respectively adjust the phase of the electric signals transmitted by the turned-on sensing electrodes according to the distances between the user's finger surface and the sensing electrode and environmental factors such as temperature, air moisture and the like. After that, in Step S503, electrical signals generated by the controlled and turned-on sensing electrodes will transmit through a protection layer covering upon the substrate to the user's finger surface. In Step S504, electric signals reflected from the user's finger surface are received by a second part of the sensing electrodes which are turned off and disposed on a substrate. Finally, in Step S505, the electric signals received by the sensing electrodes are amplified by a plurality of amplifiers in the integrated circuit, wherein each of the amplifiers is respectively corresponding to one of the second part of the sensing electrodes which are turned off. In Step S506, the amplified electric signals are processed by a processing circuit in the integrated circuit to generate a sensing signal corresponding to the user's fingerprint for recognition.

To sum up, in the fingerprint sensor and the fingerprint sensing method according to the present invention, the phase shifter controls the phase of the electric signal transmitted by each sensing electrode such that the distribution of the electric field generated by each sensing electrode can be convergent, and therefore the electric signal is able to transmit through a thicker protection layer. In addition, the sensing electrodes are controlled to be selectively turned on and groups of turned-on sensing electrodes are spaced by at least one turned-off sensing electrode, which avoids the direct coupling of electric fields and forces the electric signals to transmit upward for a longer distance and through a thicker protection layer.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the instant disclosure delineated by the following claims.

What is claimed is:

1. A fingerprint sensor, comprising:
a substrate, having a first surface and a second surface;
a plurality of sensing electrodes, disposed on the first surface of the substrate and configured to transmit and receive electric signals;
an integrated circuit disposed on the first surface of the substrate, the sensing electrodes being electrically connected to the integrated circuit; and
a protection layer, covering upon the first surface of the substrate;
wherein the integrated circuit comprises a plurality of phase shifters and each of the phase shifters is electrically connected to one of the sensing electrodes correspondingly, and when a part of the sensing electrodes are turned on, the phase shifters respectively control the corresponding turned-on sensing electrodes to adjust the phases of the electrical signals generated by the turned-on sensing electrodes, such that the wave fronts of the electric signals transmitted by the turned-on sensing electrodes are converged.

2. The fingerprint sensor according to claim 1, wherein the sensing electrodes are disposed on the first surface of the substrate in a one-dimensional linear arrangement or a two-dimensional matrix arrangement.

3. The fingerprint sensor according to claim 1, wherein the sensing electrodes are transistors formed on semiconductor materials, glass or film.

4. The fingerprint sensor according to claim 2, wherein the sensing electrodes are controlled to be selectively turned on, and wherein groups of turned-on sensing electrodes are spaced by at least one turned-off sensing electrode.

5. The fingerprint sensor according to claim 1, wherein the fingerprint sensor is a swipe-type fingerprint sensor or a touch-type fingerprint sensor.

6. The fingerprint sensor according to claim 1, wherein the integrated circuit comprises:
a plurality of amplifiers, each of the amplifiers is electrically connected to one of the sensing electrodes correspondingly; and
a processing circuit, electrically connected to the amplifiers, to process the electric signals received by the sensing electrodes and generate a sensing signal corresponding to the user's fingerprint for recognition.

7. A fingerprint sensing method, applied in a fingerprint sensor, comprising:
turning on a first part of sensing electrodes on a substrate;
controlling, via a plurality of phase shifters, the first part of sensing electrodes to adjust the phases of the electrical signals generated by the first part of sensing electrodes, wherein each of the phase shifters is respectively corresponding to one of the first part of the sensing electrodes;
transmitting the electrical signals to travel through a protection layer covering upon the substrate to the user's finger surface; and
receiving the electric signals reflected from the user's finger surface by a second part of the sensing electrodes on the substrate;
wherein each of the phase shifters is electrically connected to one of the sensing electrodes correspondingly, to control the phase of the electric signal transmitted by the corresponding turned-on sensing electrode, such that the wave fronts of the electric signals transmitted by the turned-on sensing electrodes are converged.

8. The fingerprint sensing method according to claim 7, wherein the sensing electrodes are disposed on the first surface of the substrate in a one-dimensional linear arrangement or a two-dimensional matrix arrangement.

9. The fingerprint sensing method according to claim 7, wherein the sensing electrodes are transistors formed on semiconductor materials, glass or film.

10. The fingerprint sensing method according to claim 8, wherein the sensing electrodes are controlled to be selectively turned on, and wherein groups of turned-on sensing electrodes are spaced by at least one turned-off sensing electrode.

11. The fingerprint sensing method according to claim 7, wherein the fingerprint sensor is a swipe-type fingerprint sensor or a touch-type fingerprint sensor.

12. The fingerprint sensing method according to claim 7, further comprising:
amplifying the electric signals received by the sensing electrodes via a plurality of amplifiers in the integrated circuit, wherein each of the amplifiers is corresponding to one of the second part of the sensing electrodes; and processing the amplified electric signals via a processing circuit in the integrated circuit to generate a sensing signal corresponding to the user's fingerprint for recognition.

\* \* \* \* \*